US011961646B2

(12) United States Patent
Watanabe

(10) Patent No.: US 11,961,646 B2
(45) Date of Patent: Apr. 16, 2024

(54) SOFT MAGNETIC POWDER, POWDER MAGNETIC CORE, MAGNETIC ELEMENT, AND ELECTRONIC DEVICE

(71) Applicant: SEIKO EPSON CORPORATION, Tokyo (JP)

(72) Inventor: Mayu Watanabe, Hachinohe (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/665,797

(22) Filed: Feb. 7, 2022

(65) Prior Publication Data

US 2022/0262552 A1 Aug. 18, 2022

(30) Foreign Application Priority Data

Feb. 8, 2021 (JP) ................................ 2021-018523

(51) Int. Cl.
*H01F 1/147* (2006.01)
*C22C 38/00* (2006.01)
(Continued)

(52) U.S. Cl.
CPC ....... *H01F 1/14766* (2013.01); *C22C 38/002* (2013.01); *C22C 38/02* (2013.01);
(Continued)

(58) Field of Classification Search
CPC ...... B22F 1/07; B22F 1/08; B22F 1/10; B22F 2009/0828; B22F 2999/00; B22F 3/02; B22F 5/106; B22F 9/008; C22C 2200/02; C22C 2200/04; C22C 2202/02; C22C 33/0257; C22C 33/0278; C22C 38/002;
(Continued)

(56) References Cited

U.S. PATENT DOCUMENTS

2010/0230010 A1* 9/2010 Yoshizawa .......... H01F 1/15333 148/403
2017/0148554 A1 5/2017 Kudo
(Continued)

FOREIGN PATENT DOCUMENTS

JP 2019-189928 A 10/2019

OTHER PUBLICATIONS

Optimum Soft Magnetic Properties of the FeSiBNbCu Alloy Achieved by Heat Treatment and Tailoring B/Si Ratio Jonghee Han, Seoyeon Kwon, Sungwoo Sohn , Jan Schroers and Haein Choi-Yim (Year: 2020).*

*Primary Examiner* — Jenny R Wu
(74) *Attorney, Agent, or Firm* — Oliff PLC

(57) ABSTRACT

A soft magnetic powder including particles having a composition represented by $Fe_xCu_aNb_b(Si_{1-y}B_y)_{100-x-a-b}$ [provided that a, b, and x are each a number whose unit is at % and satisfy 0.3≤a≤2.0, 2.0≤b≤4.0, and 73.0≤x≤79.5, respectively, and y is a number satisfying f(x)≤y≤0.99, in which $f(x)=(4\times10^{-34})x^{17.56}$], wherein the particle contains a crystal grain having a grain diameter of 1.0 nm or more and 30.0 nm or less, and includes a Cu segregated portion in which Cu is segregated, the Cu segregated portion is present at a position deeper than 30 nm from a surface of the particle, and a maximum Cu concentration in the Cu segregated portion exceeds 6.0 at %.

18 Claims, 7 Drawing Sheets

(51) Int. Cl.

*C22C 38/02* (2006.01)
*C22C 38/12* (2006.01)
*C22C 38/16* (2006.01)
*H01F 27/255* (2006.01)

(52) U.S. Cl.

CPC .............. *C22C 38/12* (2013.01); *C22C 38/16* (2013.01); *H01F 27/255* (2013.01); *C22C 2202/02* (2013.01)

(58) Field of Classification Search

CPC ......... C22C 38/02; C22C 38/12; C22C 38/16; C22C 45/02; H01F 1/14766; H01F 1/15333; H01F 1/22; H01F 27/255; H01F 3/08; H01F 41/0246

See application file for complete search history.

(56) References Cited

U.S. PATENT DOCUMENTS

2019/0333663 A1 10/2019 Watanabe et al.
2020/0258665 A1 8/2020 Kudo et al.

* cited by examiner

SOFT MAGNETIC POWDER, POWDER MAGNETIC CORE, MAGNETIC ELEMENT, AND ELECTRONIC DEVICE

The present application is based on, and claims priority from JP Application Serial Number 2021-018523, filed Feb. 8, 2021, the disclosure of which is hereby incorporated by reference herein in its entirety.

BACKGROUND

1. Technical Field

The present disclosure relates to a soft magnetic powder, a powder magnetic core, a magnetic element, and an electronic device.

2. Related Art

In various mobile devices provided with a magnetic element including a powder magnetic core, in order to reduce the size and increase the output, it needs to be adapted to a high frequency of the conversion frequency and a high electric current of a switched-mode power supply. Along with this, also a soft magnetic powder contained in the powder magnetic core is required to be adapted to a high frequency and a high electric current.

JP-A-2019-189928 (Patent Document 1) discloses a soft magnetic powder which has a composition represented by $Fe_xCu_aNb_b(Si_{1-y}B_y)_{100-x-a-b}$ [provided that a, b, and x each represent at % and are numbers satisfying 0.3≤a≤2.0, 2.0≤b≤4.0, and 73.0≤x≤79.5, respectively, and y is a number satisfying f(x)≤y<0.99, in which $f(x)=(4\times10^{-34})x^{17.56}$], and contains a crystalline structure having a grain diameter of 1.0 nm or more and 30.0 nm or less at 30 vol % or more. According to such a soft magnetic powder, fine crystals are contained, and therefore, a low core loss at a high frequency can be achieved.

However, the soft magnetic powder described in Patent Document 1 has still room for improvement in terms of stably achieving excellent soft magnetism even under a high electric current. Specifically, in the soft magnetic powder, it has an object to further decrease the coercive force, and also further increase the saturation magnetic flux density so that magnetic saturation does not occur in a green compact even under a high electric current.

SUMMARY

A soft magnetic powder according to an application example of the present disclosure includes

- particles having a composition represented by $Fe_xCu_aNb_b(Si_{1-y}B_y)_{100-x-a-b}$ [provided that a, b, and x are each a number whose unit is at % and satisfy 0.3≤a≤2.0, 2.0≤b≤4.0, and 73.0≤x≤79.5, respectively, and y is a number satisfying f(x)≤y≤0.99, in which $f(x)=(4\times10^{-34})x^{17.56}$], wherein
- the particle contains a crystal grain having a grain diameter of 1.0 nm or more and 30.0 nm or less, and
- includes a Cu segregated portion in which Cu is segregated,
- the Cu segregated portion is present at a position deeper than 30 nm from a surface of the particle, and
- a maximum Cu concentration in the Cu segregated portion exceeds 6.0 at %.

A powder magnetic core according to an application example of the present disclosure includes the soft magnetic powder according to the application example of the present disclosure.

A magnetic element according to an application example of the present disclosure includes the powder magnetic core according to the application example of the present disclosure.

An electronic device according to an application example of the present disclosure includes the magnetic element according to the application example of the present disclosure.

DESCRIPTION OF EXEMPLARY EMBODIMENTS

Figure 1:
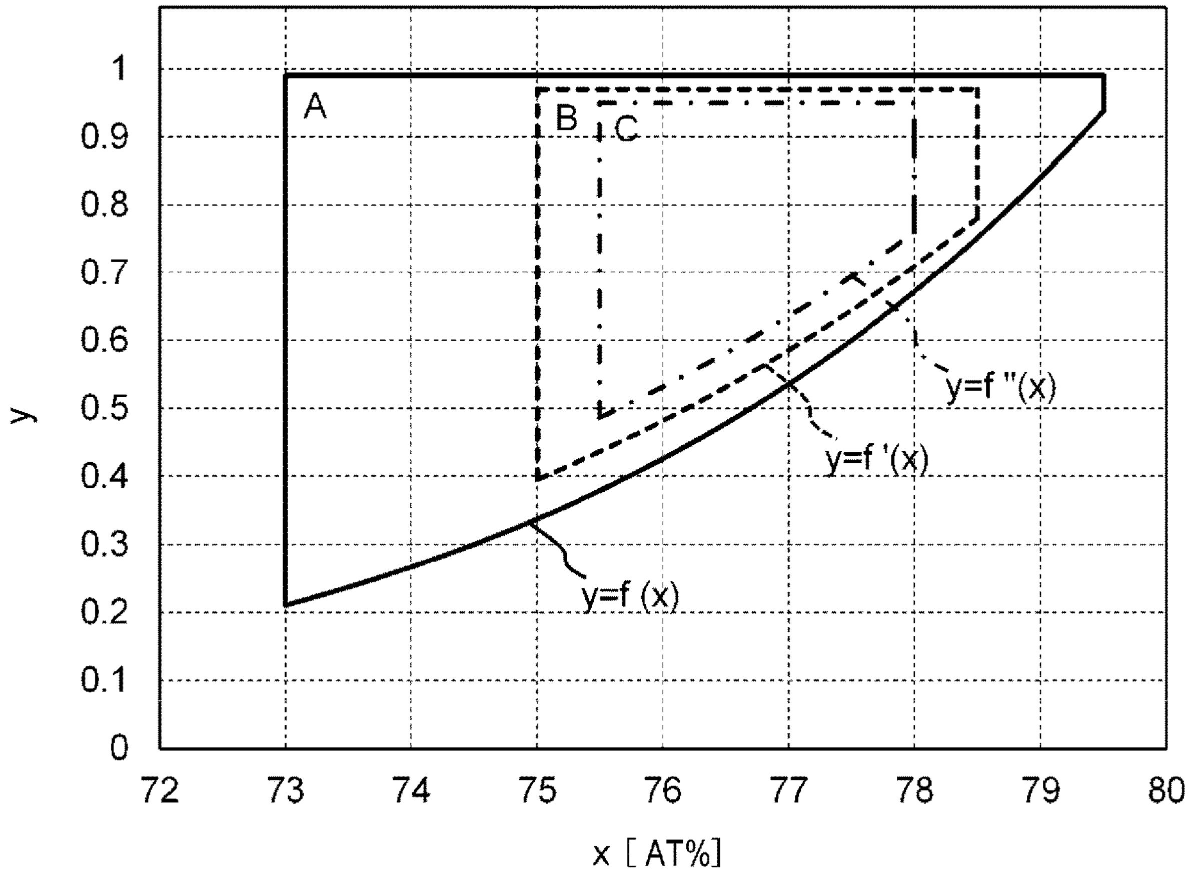
FIG. 1 is a view showing a region in which the range of x and the range of y in a compositional formula of a soft magnetic powder according to an embodiment overlap with each other in a two-axis orthogonal coordinate system in which x represents the horizontal axis and y represents the vertical axis.

Hereinafter, a soft magnetic powder, a powder magnetic core, a magnetic element, and an electronic device according to the present disclosure will be described in detail based on preferred embodiments shown in the accompanying drawings.

1. Soft Magnetic Powder

The soft magnetic powder according to an embodiment is a metal powder exhibiting soft magnetism. Such a soft magnetic powder can be applied to any purpose, and is used for, for example, producing various green compacts such as a powder magnetic core and a magnetic wave absorber by binding particles to one another through a binding material.

The soft magnetic powder according to the embodiment includes particles having a composition represented by $Fe_xCu_aNb_b(Si_{1-y}B_y)_{100-x-a-b}$.

The a, b, and x are each a number whose unit is at %. Then, a satisfies 0.3≤a≤2.0, b satisfies 2.0≤b≤4.0, and x satisfies 73.0≤x≤79.5.

Further, y satisfies f(x)≤y≤0.99. Then, f(x) $(4\times10^{-34})x^{17.56}$.

The particle included in the soft magnetic powder according to the embodiment contains a crystal grain having a grain diameter of 1.0 nm or more and 30.0 nm or less, and also includes a Cu segregated portion in which Cu is segregated. The Cu segregated portion is present at a position deeper than 30 nm from a surface of the particle. Further, a maximum Cu concentration in the Cu segregated portion exceeds 6.0 at %.

According to such a soft magnetic powder, both a low coercive force and a high saturation magnetic flux density are achieved. Therefore, a powder magnetic core, which has a low core loss, and in which magnetic saturation is less likely to occur even at a high electric current, can be realized. Then, a magnetic element which is adaptable to a high electric current, enables miniaturization, and can increase the output with high efficiency can be realized.

Hereinafter, the composition of the particles of the soft magnetic powder according to the embodiment will be described.

1.1. Composition

Fe (iron) has a large effect on the basic magnetic properties and mechanical properties of the soft magnetic powder according to the embodiment.

The content x of Fe is set to 73.0 at % or more and 79.5 at % or less, but is set to preferably 75.0 at % or more and 78.5 at % or less, and more preferably 75.5 at % or more and 78.0 at % or less. When the content x of Fe is less than the above lower limit, there is a fear that the saturation magnetic flux density of the soft magnetic powder may decrease. On the other hand, when the content x of Fe exceeds the above upper limit, the amorphous structure cannot be stably formed when producing the soft magnetic powder, and therefore, there is a fear that it may become difficult to form a crystal grain having a small grain diameter as described above.

Cu (copper) tends to be separated from Fe when producing the soft magnetic powder according to the embodiment from a raw material. Therefore a fluctuation in the composition is caused by the inclusion of Cu, and thus, a region that is easily crystallized is partially formed in the particle. As a result, the deposition of an Fe phase with a body-centered cubic lattice that is relatively easily crystallized is promoted, and thus, the formation of the crystal grain having a small grain diameter as described above can be facilitated.

The content a of Cu is set to 0.3 at % or more and 2.0 at % or less, but is set to preferably 0.5 at % or more and 1.5 at % or less, and more preferably 0.7 at % or more and 1.3 at % or less. When the content a of Cu is less than the above lower limit, the micronization of the crystal grain is impaired, and there is a fear that the crystal grain having a grain diameter within the above range cannot be formed. On the other hand, when the content a of Cu exceeds the above upper limit, there is a fear that the mechanical properties of the soft magnetic powder may deteriorate, resulting in embrittlement.

Nb (niobium) contributes to the micronization of the crystal grain along with Cu when subjecting a powder containing an amorphous structure in a large amount to a heat treatment. Therefore, the formation of the crystal grain having a small grain diameter as described above can be facilitated.

The content b of Nb is set to 2.0 at % or more and 4.0 at % or less, but is set to preferably 2.5 at % or more and 3.5 at % or less, and more preferably 2.7 at % or more and 3.3 at % or less. When the content b of Nb is less than the above lower limit, the micronization of the crystal grain is impaired, and there is a fear that the crystal grain having a grain diameter within the above range cannot be formed. On the other hand, when the content b of Nb exceeds the above upper limit, there is a fear that the mechanical properties of the soft magnetic powder may deteriorate, resulting in embrittlement. Further, there is a fear that the magnetic permeability of the soft magnetic powder may deteriorate.

Si (silicon) promotes amorphization when producing the soft magnetic powder according to the embodiment from a raw material. Therefore, when producing the soft magnetic powder according to the embodiment, first, a homogeneous amorphous structure is formed, and thereafter, the amorphous structure is crystallized, whereby crystal grains having a more uniform grain diameter are easily formed. Then, the uniform grain diameter contributes to the averaging out of magnetocrystalline anisotropy in each crystal grain, and therefore, the coercive force can be decreased and also the magnetic permeability can be increased, and thus, the improvement of soft magnetism can be achieved.

B (boron) promotes amorphization when producing the soft magnetic powder according to the embodiment from a raw material. Therefore, when producing the soft magnetic powder according to the embodiment, first, a homogeneous amorphous structure is formed, and thereafter, the amorphous structure is crystallized, whereby crystal grains having a more uniform grain diameter are easily formed. Then, the uniform grain diameter contributes to the averaging out of magnetocrystalline anisotropy in each crystal grain, and therefore, the coercive force can be decreased and also the magnetic permeability can be increased, and thus, the improvement of soft magnetism can be achieved. Further, by using Si and B in combination, based on the difference in atomic radius between Si and B, it is possible to synergistically promote amorphization.

Here, when the total content of Si and B is assumed to be 1 and the ratio of the content of B to the total content is represented by y, the ratio of the content of Si to the total content is represented by (1-y).

This y is a number satisfying $f(x) \leq y \leq 0.99$, and f(x) which is a function of x satisfies $f(x)=(4\times10^{-34})x^{17.56}$.

FIG. 1 is a view showing a region in which the range of x and the range of y in the compositional formula of the soft magnetic powder according to the embodiment overlap with each other in a two-axis orthogonal coordinate system in which x represents the horizontal axis and y represents the vertical axis.

In FIG. 1, a region A in which the range of x and the range of y overlap with each other is located inside a solid line drawn in the orthogonal coordinate system.

Specifically, the region A is a closed region surrounded by three straight lines and one curved line drawn when plotting (x, y) coordinates satisfying the following four equations: $x=73.0$, $x=79.5$, $y=f(x)$, and $y=0.99$ in the orthogonal coordinate system.

Further, y is preferably a number satisfying $f'(x) \leq y \leq 0.97$. Then, f'(x) which is a function of x satisfies $f'(x)=(4\times10^{-29})x^{14.93}$.

A broken line shown in FIG. 1 shows a region B in which the range of the above-mentioned preferred x and the range of the above-mentioned preferred y overlap with each other.

Specifically, the region B is a closed region surrounded by three straight lines and one curved line drawn when plotting (x, y) coordinates satisfying the following four equations: $x=75.0$, $x=78.5$, $y=f'(x)$, and $y=0.97$ in the orthogonal coordinate system.

Further, y is more preferably a number satisfying $f''(x) \leq y \leq 0.95$. Then, f''(x) which is a function of x satisfies $f''(x)=(4\times10^{-29})x^{14.93}+0.05$.

An alternate long and short dash line shown in FIG. 1 shows a region C in which the range of the above-mentioned more preferred x and the range of the above-mentioned more preferred y overlap with each other.

Specifically, the region C is a closed region surrounded by three straight lines and one curved line drawn when plotting (x, y) coordinates satisfying the following four equations: x=75.5, x=78.0, y=f"(x), and y=0.95 in the orthogonal coordinate system.

The soft magnetic powder in which x and y are included at least in the region A can form a homogeneous amorphous structure with a high probability when it is produced. Therefore, by crystallizing the amorphous structure, crystal grains having a particularly uniform grain diameter can be formed. Accordingly, the soft magnetic powder in which the coercive force is sufficiently decreased is obtained. By using the soft magnetic powder, the core loss of a powder magnetic core can be suppressed sufficiently small.

Further, the soft magnetic powder in which x and y are included at least in the region A can form uniform crystal grains even when the content of Fe is sufficiently increased. Accordingly, the soft magnetic powder in which the saturation magnetic flux density is sufficiently increased is obtained. As a result, a powder magnetic core having a high saturation magnetic flux density is obtained while sufficiently decreasing the core loss.

In a case where the value of y is smaller than the region A, the balance between the content of Si and the content of B deteriorates, and therefore, it becomes difficult to form a homogeneous amorphous structure when producing the soft magnetic powder. Therefore, crystal grains having a small grain diameter cannot be formed, and the coercive force cannot be sufficiently decreased.

On the other hand, also in a case where the value of y is larger than the region A, the balance between the content of Si and the content of B deteriorates, and therefore, it becomes difficult to form a homogeneous amorphous structure when producing the soft magnetic powder. Therefore, crystal grains having a small grain diameter cannot be formed, and the coercive force cannot be sufficiently decreased.

The lower limit of y is determined by the function of x as described above, but is set to preferably 0.30 or more, more preferably 0.45 or more, and further more preferably 0.55 or more. According to this, the saturation magnetic flux density of the soft magnetic powder can be further increased.

In particular, the region B and the region C are regions in which the value of x is large even in the region A, and therefore, the content of Fe is high. Due to this, the saturation magnetic flux density of the soft magnetic powder is easily increased. Therefore, by using the soft magnetic powder in which x and y are included at least in the region B, a decrease in the size and an increase in the output of a powder magnetic core or a magnetic element can be achieved.

Further, (100-x-a-b) that is the sum of the content of Si and the content of B is not particularly limited, but is preferably 15.0 at % or more and 24.0 at % or less, more preferably 16.0 at % or more and 23.0 at % or less, and further more preferably 16.0 at % or more and 22.0 at % or less. When (100-x-a-b) is within the above range, crystal grains having a particularly uniform grain diameter can be formed in the soft magnetic powder.

In view of the above, y(100-x-a-b) corresponds to the content of B in the soft magnetic powder. y(100-x-a-b) is appropriately set in consideration of the coercive force, the saturation magnetic flux density, etc. as described above, but it is preferred to satisfy 5.0≤y(100-x-a-b)≤17.0, it is more preferred to satisfy 7.0≤y(100-x-a-b)≤16.0, and it is further more preferred to satisfy 8.0≤y(100-x-a-b)≤15.0.

According to this, the soft magnetic powder containing B (boron) at a relatively high concentration is obtained. Such a soft magnetic powder can form a uniform amorphous structure when it is produced even when the content of Fe is high. Therefore, by the subsequent heat treatment, crystal grains having a small grain diameter and a relatively uniform grain diameter can be formed, and a high saturation magnetic flux density can be achieved while sufficiently decreasing the coercive force.

When y(100-x-a-b) is less than the above lower limit, the content of B becomes smaller, and therefore, when the soft magnetic powder is produced, there is a fear that amorphization may become difficult depending on the overall composition. On the other hand, when y(100-x-a-b) exceeds the above upper limit, the content of B increases and the content of Si relatively decreases, and therefore, there is a fear that the magnetic permeability of the soft magnetic powder may decrease and the saturation magnetic flux density may decrease.

Further, the soft magnetic powder according to the embodiment may contain impurities other than the composition represented by $Fe_xCu_aNb_b(Si_{1-y}B_y)_{100-x-a-b}$ described above. Examples of the impurities include any elements other than the above-mentioned elements, however, the total content of impurities is preferably 0.50 at % or less. When the total content thereof is within this range, the impurities hardly inhibit the effects of the present disclosure, and therefore, the incorporation thereof is permitted.

The content of each impurity element is preferably 0.05 at % or less. When the content thereof is within this range, the impurities hardly inhibit the effects of the present disclosure, and therefore, the incorporation thereof is permitted.

Note that (100-x-a-b) that is the sum of the content of Si and the content of B is uniquely determined according to the values of x, a, and b, however, a deviation of ±0.50 at % or less by taking (100-x-a-b) as a central value due to the production error or the effect of impurities is permitted.

Hereinabove, the composition of the soft magnetic powder according to the embodiment has been described, however, the composition and impurities are determined by an analytical method as described below.

Examples of such an analytical method include Iron and steel—Atomic absorption spectrometric method specified in JIS G 1257:2000, Iron and steel—ICP atomic emission spectrometric method specified in JIS G 1258:2007, Iron and steel—Method for spark discharge atomic emission spectrometric analysis specified in JIS G 1253:2002, Iron and steel—Method for X-ray fluorescence spectrometric analysis specified in JIS G 1256:1997, and gravimetry, titrimetry, and absorption spectroscopy specified in JIS G 1211 to G 1237.

Specifically, for example, an optical emission spectrometer for solids, particularly, a spark emission spectrometer, model: Spectrolab, type: LAVMB08A manufactured by SPECTRO Analytical Instruments GmbH or an ICP device, model: CIROS-120 manufactured by Rigaku Corporation is exemplified.

Further, particularly when C (carbon) and S (sulfur) are determined, an infrared absorption method after combustion in a stream of oxygen (after combustion in a high-frequency induction heating furnace) specified in JIS G1211:2011 is also used. Specifically, a carbon/sulfur analyzer, CS-200 manufactured by LECO Corporation is exemplified.

Further, when N (nitrogen) and O (oxygen) are particularly determined, Iron and steel—Method for determination of nitrogen content specified in JIS G 1228:1997 and General rules for determination of oxygen in metallic materials specified in JIS Z 2613:2006 are also used. Specifically, an oxygen/nitrogen analyzer, TC-300/EF-300 manufactured by LECO Corporation is exemplified.

1.2. Crystal Grain

The particle of the soft magnetic powder according to the embodiment contains a crystal grain having a crystal grain diameter of 1.0 nm or more and 30.0 nm or less. The crystal grain having such a grain diameter is small, and therefore, the magnetocrystalline anisotropy in each crystal grain is easily averaged out. Therefore, the coercive force can be decreased, and a powder which is especially magnetically soft is obtained. In addition, when the crystal grain having such a grain diameter is contained in a given amount or more, the magnetic permeability of the soft magnetic powder becomes high. As a result, a powder rich in soft magnetism having a low coercive force and a high magnetic permeability is obtained. Further, due to the increase in the magnetic permeability, magnetic saturation is less likely to occur even under a high electric current, and therefore, the saturation magnetic flux density of the soft magnetic powder can be increased.

In the particle, the content ratio of the crystal grains having a grain diameter within the above range is preferably set to 30 vol % or more, but is set to more preferably 40 vol % or more and 99 vol % or less, and further more preferably 55 vol % or more and 95 vol % or less. When the content ratio of the crystal grains having a grain diameter within the above range is less than the above lower limit, the ratio of the crystal grains having a small grain diameter decreases, and therefore, the averaging out of magnetocrystalline anisotropy is insufficient, and thus, there is a fear that the magnetic permeability of the soft magnetic powder may decrease or the coercive force of the soft magnetic powder may increase. On the other hand, the content ratio of the crystal grains having a grain diameter within the above range may exceed the above upper limit, however, as described later, there is a fear that the effect of coexistence with an amorphous structure may become insufficient as described later.

Further, the soft magnetic powder according to the embodiment may contain a crystal grain having a grain diameter outside the above range, that is, a grain diameter less than 1.0 nm or exceeding 30.0 nm. In this case, the content ratio of the crystal grains having a grain diameter outside the above range is suppressed to preferably 10 vol % or less, and more preferably 5 vol % or less. According to this, a decrease in the above-mentioned effect due to the crystal grain having a grain diameter outside the above range can be suppressed.

The grain diameter of the crystal grain of the soft magnetic powder is obtained by, for example, a method in which a cut face of the particle of the soft magnetic powder is observed using an electron microscope and the grain diameter is read from the observation image. In this method, a perfect circle having the same area as that of the crystal grain is assumed, and the diameter of the perfect circle, that is, the circle equivalent diameter can be regarded as the grain diameter of the crystal grain.

It is considered that the volume ratio occupied by the crystal grains is substantially the same as the area ratio of the crystal grains to the area of the cut face, and therefore, the area ratio may be regarded as the content ratio.

Further, in the soft magnetic powder according to the embodiment, the average grain diameter of the crystal grains is preferably 2.0 nm or more and 25.0 nm or less, and more preferably 5.0 nm or more and 20.0 nm or less. According to this, the above-mentioned effect, that is, the effect that the coercive force decreases and the magnetic permeability increases becomes more pronounced.

The average grain diameter of the crystal grains of the soft magnetic powder is determined by, for example, a method in which the width of a peak derived from Fe in an X-ray diffraction pattern of the soft magnetic powder is obtained, and the average grain diameter is calculated from the value using the Halder-Wagner method other than the method in which the grain diameter of the crystal grain is obtained as described above and the obtained grain diameter is averaged out.

The particle of the soft magnetic powder according to the embodiment may further contain an amorphous structure. By the coexistence of the crystal grain having a grain diameter within the above range and the amorphous structure, the magnetostriction is cancelled out by each other, and therefore, the magnetostriction of the soft magnetic powder can be further decreased. As a result, a soft magnetic powder having a particularly high magnetic permeability is obtained. In addition, at the same time, a soft magnetic powder whose magnetization is easily controlled is obtained. Further, by the inclusion of the amorphous structure, it becomes easy to maintain the grain diameter of the crystal grain finer and more uniform.

The content ratio of the amorphous structure in the particle in volume ratio is preferably 5.0 times or less, more preferably 0.02 times or more and 2.0 times or less, and further more preferably 0.10 times or more and less than 1.0 times the content ratio of the crystal grain having a grain diameter within the above range. According to this, the balance between the crystal grain and the amorphous structure is optimized, and the effect of the coexistence of the crystal grain and the amorphous structure is more pronounced.

1.3. Cu Segregated Portion

The particle of the soft magnetic powder according to the embodiment includes a Cu segregated portion in which Cu is locally segregated to the periphery. The Cu segregated portion is present at a position deeper than 30 nm from a surface of the particle. Further, a maximum Cu concentration in the Cu segregated portion exceeds 6.0 at %.

By the inclusion of the Cu segregated portion in the particle, the crystal grain can be prevented from becoming coarse during the heat treatment. Accordingly, uniform crystal grains can be formed by the heat treatment. As a result, the soft magnetic powder in which both a low coercive force and a high saturation magnetic flux density are achieved is obtained.

The Cu segregated portion is present at a position deeper than 30 nm from the surface of the particle. By the presence of the Cu segregated portion at such a deep position, the above-mentioned effect of the Cu segregated portion occurs to the deep position, that is, from the surface of the particle to the deep position. In other words, an effect of preventing the crystal grain from becoming coarse during the heat treatment occurs to the deep position. According to this, the grain diameter of the crystal grains can be made fine and uniform in more parts within the particle, and both a low coercive force and a high saturation magnetic flux density can be achieved.

The depth of the Cu segregated portion from the surface of the particle can be specified from a surface analysis image obtained through an analysis for a cross section of the particle by energy dispersive X-ray spectroscopy (EDX) using a scanning transmission electron microscope (STEM). Specifically, with respect to the cross section of the particle, an image of a 250-nm square region including the surface of the particle is captured, and also segregation of Cu is specified by an elemental analysis. Then, the depth of the Cu segregated portion from the surface of the particle is determined as a distance from the surface of the particle of the Cu segregated portion in which the Cu concentration is the highest in the surface analysis image. At this time, it is preferred that a region where the depth from the surface of the particle is 200 nm or more is in the image.

The depth of the Cu segregated portion is set to more than 30 nm as described above, but is set to preferably 40 nm or more and 500 nm or less, and more preferably 50 nm or more and 400 nm or less.

The maximum Cu concentration in the Cu segregated portion exceeds 6.0 at %. By the inclusion of the Cu segregated portion in which Cu is segregated at a high concentration in this manner, the Cu segregated portion acts as a nucleation site in the heat treatment and makes an Fe-based crystal grain easy to grow. According to this, crystal grains having a uniform grain diameter can be generated from the surface of the particle to a deep position. As a result, both the averaging out of magnetocrystalline anisotropy and the increase in the proportion of inclusion of crystal grains having a uniform grain diameter can be achieved, and both a low coercive force and a high saturation magnetic flux density can be further favorably achieved.

The maximum Cu concentration in the Cu segregated portion is determined as the maximum value of the Cu concentration by measuring the Cu concentration in the region captured in the image through an elemental analysis by EDX.

The maximum Cu concentration in the Cu segregated portion is set to more than 6.0 at % as described above, but is set to preferably 10.0 at % or more, and more preferably 16.0 at % or more. According to this, the growth of crystal grains using the Cu segregated portion as the nucleation site is particularly promoted. As a result, crystal grains having a more uniform grain diameter can be generated to a particularly deep position. The upper limit of the maximum Cu concentration is not particularly limited, but is preferably 70.0 at % or less, and more preferably 60.0 at % or less from the viewpoint of preventing the distribution of the Cu segregated portion from being biased.

Further, the Cu concentration in the Cu segregated portion is preferably twice or more, more preferably three times or more the matrix phase. According to this, the Cu concentration in the Cu segregated portion becomes sufficiently higher than the Cu concentration in the matrix phase, and an effect of preventing the crystal grains from becoming coarse during the heat treatment is more reliably obtained. Note that the matrix phase refers to a region at a depth of 500 nm from the surface of the particle.

Further, in the above-mentioned surface analysis image, when the number is counted up for each diameter of the Cu segregated portion with respect to a 200-nm square region including the Cu segregated portion, the average grain diameter of the Cu segregated portions can be calculated. Specifically, first, with respect to the surface analysis image, a binarized image analysis is performed, and a region occupied by the Cu segregated portion is extracted. Subsequently, a circle equivalent diameter of the extracted region, that is, a grain diameter of the Cu segregated portion is calculated. Then, the number is counted up for each diameter of the Cu segregated portion, and the average grain diameter is calculated from the count up results.

The average grain diameter of the Cu segregated portions calculated in this manner is preferably 3 nm or more and 20 nm or less, more preferably 5 nm or more and 15 nm or less, and further more preferably 5 nm or more and 12 nm or less. When the average grain diameter of the Cu segregated portion is within the above range, crystal grains that are sufficiently fine and more uniform can be formed by the heat treatment. As a result, the coercive force of the soft magnetic powder can be further decreased.

As described above, the soft magnetic powder according to the embodiment includes particles having a composition represented by $Fe_xCu_aNb_b(Si_{1-y}B_y)_{100-x-a-b}$. Provided that a, b, and x are each a number whose unit is at %. Then, a satisfies $0.3 \le a \le 2.0$, b satisfies $2.0 \le b \le 4.0$, and x satisfies $73.0 \le x \le 79.5$. Further, y satisfies $f(x) \le y \le 0.99$. Then, $f(x) = (4 \times 10^{-34})x^{17.56}$.

The particle included in the soft magnetic powder according to the embodiment contains a crystal grain having a grain diameter of 1.0 nm or more and 30.0 nm or less, and also includes a Cu segregated portion in which Cu is segregated. The Cu segregated portion is present at a position deeper than 30 nm from a surface of the particle. Further, a maximum Cu concentration in the Cu segregated portion exceeds 6.0 at %.

According to such a configuration, the soft magnetic powder in which both a low coercive force and a high saturation magnetic flux density are achieved is obtained. Therefore, a powder magnetic core, which has a low core loss, and in which magnetic saturation is less likely to occur even at a high electric current, can be realized. Then, a magnetic element which is adaptable to a high electric current, enables miniaturization, and can increase the output with high efficiency can be realized.

1.4. Si Segregated Portion

The particle of the soft magnetic powder according to the embodiment includes a Si segregated portion in which Si is segregated. The Si segregated portion is present between the Cu segregated portion and the surface of the particle. By the inclusion of the Si segregated portion present at such a position, the insulating property of the particle is improved. According to this, the occurrence of an eddy current flowing in a path between the particles can be suppressed.

The depth of the Si segregated portion from the surface of the particle can be specified from a surface analysis image obtained through an analysis for a cross section of the particle by energy dispersive X-ray spectroscopy (EDX) using a scanning transmission electron microscope (STEM). Specifically, with respect to a cross section of the particle, an image of a 250-nm square region including the surface of the particle is captured, and also segregation of Si is specified by an elemental analysis, and the depth is determined as a distance to the Si segregated portion located at the shallowest position from the surface of the particle. At this time, it is preferred that a region where the depth from the surface of the particle is 200 nm or more is in the image.

The maximum Si concentration in the Si segregated portion is set to preferably 10.0 at % or more, more preferably 15.0 at % or more and 60.0 at % or less, and further more preferably 20.0 at % or more and 50.0 at % or less. When the maximum Si concentration exceeds the above upper limit, the amount of Si distributed in the crystal grain relatively decreases, and therefore, there is a fear that the high saturation magnetic flux density derived from the crystal grain may be impaired.

In a case where the soft magnetic powder has the above-mentioned composition, such a Si segregated portion is easily formed particularly when the relationship between x and y is within the region shown in FIG. 1.

1.5. Fe Concentration Distribution

In the particle of the soft magnetic powder according to the embodiment, it is preferred that the Fe concentration at a position 12 nm from the surface of the particle is higher than the O concentration in atomic concentration ratio. According to this, for example, the particle in which, for example, an oxide film containing an oxide such as $SiO_2$ as a main component is prevented from becoming thicker than necessary can be realized. That is, by minimizing the thickness of the oxide film and controlling the concentration of Si segregated as the oxide film, the amount of Si distributed in the crystal grain can be ensured, and also the volume ratio occupied by the crystal grain can be ensured. As a result, the soft magnetic powder having a higher saturation magnetic flux density is obtained.

The Fe concentration and the O concentration can be specified from the results of a surface analysis (mapping) and a line analysis (line scanning) obtained through an analysis for a cross section of the particle by energy dispersive X-ray spectroscopy (EDX) using a scanning transmission electron microscope (STEM).

Further, a difference between the Fe concentration and the O concentration is not particularly limited, but is preferably 10 at % or more, and more preferably 30 at % or more. The upper limit of the difference between the Fe concentration and the O concentration is not particularly limited, but is preferably 80 at % or less, and more preferably 60 at % or less.

In the soft magnetic powder according to the embodiment, not all particles need to have the above-mentioned configuration, and a particle that does not have the above-mentioned configuration may be included, but it is preferred that 95 mass % or more of the particles have the above-mentioned configuration.

The soft magnetic powder according to the embodiment may be mixed with another soft magnetic powder or a non-soft magnetic powder and used in the production of a powder magnetic core or the like as a mixed powder.

1.6. Various Properties

In the soft magnetic powder according to the embodiment, the Vickers hardness of the particle is set to preferably 1000 or more and 3000 or less, and more preferably 1200 or more and 2500 or less. The soft magnetic powder including the particles having such a hardness can minimize deformation at a contact point between the particles when the soft magnetic powder is formed into a powder magnetic core by compression molding. Therefore, a contact area is suppressed small, so that the insulating property between the particles in the powder magnetic core can be increased.

If the Vickers hardness is less than the above lower limit, when the soft magnetic powder is compression molded, there is a fear that the particles may be likely to be crushed at the contact point between the particles depending on the average particle diameter of the soft magnetic powder. Due to this, the contact area increases, and therefore, there is a fear that the insulating property between the particles in a powder magnetic core may deteriorate. On the other hand, if the Vickers hardness exceeds the above upper limit, the powder compactability decreases depending on the average particle diameter of the soft magnetic powder, resulting in decreasing the density when the soft magnetic powder is formed into a powder magnetic core, and therefore, there is a fear that the saturation magnetic flux density of the powder magnetic core may decrease.

The Vickers hardness of the particle of the soft magnetic powder is measured by a micro Vickers hardness tester in a central portion of the cross section of the particle. The "central portion of the cross section of the particle" is defined as a portion corresponding to the midpoint of a major axis on a cut face of the particle when the particle is cut. Further, an indenter pushing load when performing the test is set to 1.96 N.

An average particle diameter D50 of the soft magnetic powder according to the embodiment is not particularly limited, but is preferably 1.0 μm or more and 50 μm or less, more preferably 10 μm or more and 45 μm or less, and further more preferably 20 μm or more and 40 μm or less. By using the soft magnetic powder having such an average particle diameter, a path through which an eddy current flows can be shortened, and therefore, a powder magnetic core capable of sufficiently suppressing the eddy current loss generated in the particles of the soft magnetic powder can be produced.

When the average particle diameter of the soft magnetic powder is 10 μm or more, by mixing with a soft magnetic powder having an average particle diameter smaller than that, a mixed powder capable of realizing a high compacted density can be produced. The mixed powder is also an embodiment of the soft magnetic powder according to the present disclosure. According to such a mixed powder, the packed density of the powder magnetic core is increased, and the magnetic flux density and the magnetic permeability of the powder magnetic core can be increased.

The average particle diameter D50 of the soft magnetic powder is determined as a particle diameter when the cumulative value from the small diameter side reaches 50% in the mass-based particle size distribution obtained by laser diffractometry.

When the average particle diameter of the soft magnetic powder is less than the above lower limit, the soft magnetic powder is too fine, and therefore, there is a fear that the packing property of the soft magnetic powder may be likely to deteriorate. Due to this, the molded density of the powder magnetic core that is one example of the green compact decreases, and thus, there is a fear that the magnetic flux density or the magnetic permeability of the powder magnetic core may decrease depending on the material composition or the mechanical properties of the soft magnetic powder. On the other hand, when the average particle diameter of the soft magnetic powder exceeds the above upper limit, the eddy current loss generated in the particles cannot be sufficiently suppressed depending on the material composition or the mechanical properties of the soft magnetic powder, and therefore, there is a fear that the core loss of the powder magnetic core may increase.

In a mass-based particle size distribution obtained by laser diffractometry with respect to the soft magnetic powder according to the embodiment, when the particle diameter at a cumulative value from the small diameter side of 10% is represented by D10 and the particle diameter at a cumulative value from the small diameter side of 90% is represented by D90, (D90−D10)/D50 is preferably about 1.0 or more and 2.5 or less, and more preferably about 1.2 or more and 2.3 or less. (D90−D10)/D50 is an index indicating the degree of spreading of the particle size distribution, and when this index is within the above range, the packing property of the soft magnetic powder is favorable. Due to this, a green compact having particularly high magnetic properties such as magnetic permeability and magnetic flux density is obtained.

The coercive force of the soft magnetic powder according to the embodiment is not particularly limited, but is preferably less than 2.0 [Oe] (less than 160 [A/m]), and more preferably 0.1 [Oe] or more and 1.5 [Oe] or less (39.9 [A/m]

or more and 120 [A/m] or less). By using the soft magnetic powder having a low coercive force in this manner, a powder magnetic core capable of sufficiently suppressing the hysteresis loss even at a high frequency can be produced.

The coercive force of the soft magnetic powder can be measured using, for example, a vibrating sample magnetometer such as TM-VSM 1230-MHHL, manufactured by Tamakawa Co., Ltd.

When the soft magnetic powder according to the embodiment is formed into a green compact, the magnetic permeability of the green compact at a measurement frequency of 100 MHz is preferably 15 or more, and more preferably 18 or more and 50 or less. Such a soft magnetic powder contributes to the realization of a powder magnetic core having excellent magnetic properties such as saturation magnetic flux density.

The magnetic permeability of the green compact refers to, for example, a relative magnetic permeability, that is, an effective magnetic permeability determined from the self-inductance of a closed magnetic circuit magnetic core coil when the green compact is formed into a toroidal shape. In the measurement of the magnetic permeability, for example, an impedance analyzer such as 4194A, manufactured by Agilent Technologies, Inc. is used, and the measurement frequency is set to 100 MHz. Further, the number of winding turns is set to 7, and the diameter of winding wire is set to 0.6 mm.

The saturation magnetic flux density of the soft magnetic powder according to the embodiment is preferably 1.00 [T] or more, and more preferably 1.10 [T] or more.

The saturation magnetic flux density of the soft magnetic powder is measured by, for example, the following method.

First, the true specific gravity p of the soft magnetic powder is measured using a fully automatic gas displacement pycnometer, AccuPyc 1330, manufactured by Micromeritics Instrument Corporation. Subsequently, the maximum magnetization Mm of the soft magnetic powder is measured using a vibrating sample magnetometer, VSM system, TM-VSM 1230-MHHL, manufactured by Tamakawa Co., Ltd. Then, the saturation magnetic flux density Bs is calculated according to the following formula.

$$Bs=4\pi/10000\times\rho\times Mm$$

When the soft magnetic powder according to the embodiment is formed into a columnar green compact having an inner diameter of 8 mm and a mass of 0.7 g and the green compact is compressed in an axial direction with a load of 20 kgf, a resistance value in the axial direction of the green compact is preferably 0.3 kΩ or more, and more preferably 1.0 kΩ or more. In the soft magnetic powder capable of realizing a green compact having such a resistance value, the insulating property between the particles is sufficiently ensured. Therefore, such a soft magnetic powder contributes to the realization of a magnetic element capable of suppressing the eddy current loss.

The upper limit of the resistance value is not particularly limited, however, when the suppression of the variation or the like is considered, the upper limit is preferably 30.0 kΩ or less, and more preferably 9.0 kΩ or less.

2. Method for Producing Soft Magnetic Powder

Next, a method for producing the soft magnetic powder according to the embodiment will be described.

The soft magnetic powder may be produced by any production method, and is produced by, for example, any of various powdering methods such as an atomization method such as a water atomization method, a gas atomization method, or a spinning water atomization method, a reducing method, a carbonyl method, and a pulverization method.

As the atomization method, there are a water atomization method, a gas atomization method, a spinning water atomization method, and the like classified according to the type of cooling medium or the difference in device configuration. Among these, the soft magnetic powder is preferably produced by an atomization method, more preferably produced by a water atomization method or a spinning water atomization method, and further more preferably produced by a spinning water atomization method. The atomization method is a method in which a molten metal is caused to collide with a fluid such as a liquid or a gas jetted at a high speed to atomize the molten metal and also cool the atomized metal, whereby a powder is produced. By using such an atomization method, a high cooling rate can be obtained, and therefore, amorphization can be promoted. As a result, crystal grains having a more uniform grain diameter can be formed by the heat treatment.

The "water atomization method" as used herein refers to a method in which a liquid such as water or an oil is used as a cooling liquid, and in a state where this liquid is jetted in an inverted conical shape so as to converge on one point, a molten metal is allowed to flow down toward this convergence point and collide with the cooling liquid so as to atomize the molten metal, whereby a metal powder is produced.

Further, by using a spinning water atomization method, the metal melt can be cooled at an extremely high speed. Therefore, the metal melt can be solidified in a state where the chaotic atomic arrangement in the molten metal is highly maintained. Due to this, by performing a crystallization treatment thereafter, a soft magnetic powder having crystal grains with a uniform grain diameter can be efficiently produced.

Hereinafter, a method for producing the soft magnetic powder by a spinning water atomization method will be further described.

In a spinning water atomization method, a cooling liquid is supplied by ejection along an inner circumferential face of a cooling cylindrical body, and is spun along the inner circumferential face of the cooling cylindrical body, whereby a cooling liquid layer is formed at the inner circumferential face. On the other hand, the raw material of the soft magnetic powder is melted, and while allowing the obtained molten metal to freely fall, a liquid or gas jet is blown to the molten metal. By doing this, the molten metal is scattered, and the scattered molten metal is incorporated in the cooling liquid layer. As a result, the molten metal atomized by scattering is solidified by rapid cooling, and therefore, the soft magnetic powder is obtained.

Figure 2:
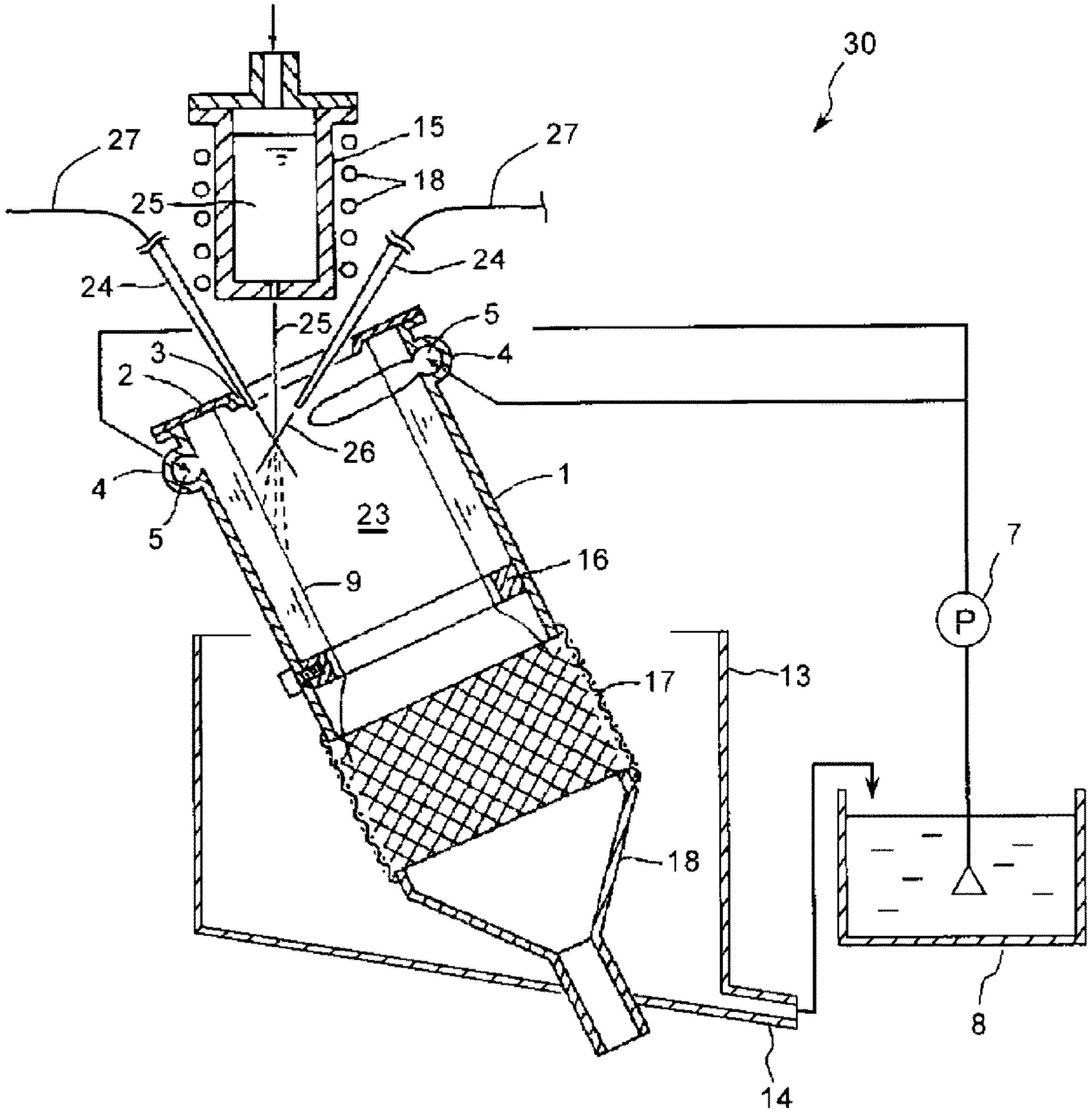
FIG. 2 is a longitudinal cross-sectional view showing one example of a device for producing a soft magnetic powder by a spinning water atomization method.

FIG. 2 is a longitudinal cross-sectional view showing one example of a device for producing the soft magnetic powder by a spinning water atomization method.

A powder production device 30 shown in FIG. 2 includes a cooling cylindrical body 1, a crucible 15, a pump 7, and a jet nozzle 24. The cooling cylindrical body 1 is a cylindrical body for forming a cooling liquid layer 9 at the inner circumferential face. The crucible 15 is a supply container for supplying and allowing a molten metal 25 to flow down into a space portion 23 inside the cooling liquid layer 9. The pump 7 supplies the cooling liquid to the cooling cylindrical body 1. The jet nozzle 24 ejects a gas jet 26 for breaking up the flowing down molten metal 25 in a thin stream into liquid droplets. The molten metal 25 is prepared according to the composition of the soft magnetic powder.

The cooling cylindrical body 1 has a circular cylindrical shape and is placed so that an axial line of the cylindrical body is along an vertical direction or is tilted at an angle of 30° or less with respect to the vertical direction.

An upper end opening of the cooling cylindrical body 1 is closed by a lid 2. In the lid 2, an opening portion 3 for supplying the flowing down molten metal 25 to the space portion 23 of the cooling cylindrical body 1 is formed.

Further, in an upper portion of the cooling cylindrical body 1, a cooling liquid ejection tube 4 for ejecting the cooling liquid to the inner circumferential face of the cooling cylindrical body 1 is provided. The cooling liquid ejection tube 4 is provided with multiple ejection ports 5 at equal intervals along a circumferential direction of the cooling cylindrical body 1.

The cooling liquid ejection tube 4 is coupled to a tank 8 through a pipe to which the pump 7 is coupled, and the cooling liquid in the tank 8 sucked by the pump 7 is supplied by ejection into the cooling cylindrical body 1 through the cooling liquid ejection tube 4. By doing this, the cooling liquid gradually flows down while spinning along the inner circumferential face of the cooling cylindrical body 1, and along with this, the cooling liquid layer 9 along the inner circumferential face is formed. A cooler may be interposed as needed in the tank 8 or in the middle of a circulation flow channel. As the cooling liquid, other than water, an oil such as silicone oil is used, and further, any of various additives may be added thereto. Further, by removing dissolved oxygen in the cooling liquid in advance, oxidation accompanying cooling of the powder to be produced can be suppressed.

Further, in a lower portion of the inner circumferential face of the cooling cylindrical body 1, a layer thickness adjustment ring 16 for adjusting the layer thickness of the cooling liquid layer 9 is detachably provided. By providing this layer thickness adjustment ring 16, the flowing down speed of the cooling liquid is controlled, and therefore, the layer thickness of the cooling liquid layer 9 is ensured, and also the uniformity of the layer thickness can be achieved.

Further, in a lower portion of the cooling cylindrical body 1, a strainer mesh body 17 having a circular cylindrical shape is continuously provided, and on a lower side of this strainer mesh body 17, a powder recovery container 18 having a funnel shape is provided. Around the strainer mesh body 17, a cooling liquid recovery cover 13 is provided so as to cover the strainer mesh body 17, and a drain port 14 formed in a bottom portion of this cooling liquid recovery cover 13 is coupled to the tank 8 through a pipe.

The jet nozzle 24 is provided in the space portion 23. The jet nozzle 24 is attached to a tip end of a gas supply tube 27 inserted through the opening portion 3 of the lid 2 and is disposed such that the ejection port thereof is oriented toward the molten metal 25 in a thin stream.

When a soft magnetic powder is produced by such a powder production device 30, first, the pump 7 is operated and the cooling liquid layer 9 is formed at the inner circumferential face of the cooling cylindrical body 1. Then, the molten metal 25 in the crucible 15 is allowed to flow down into the space portion 23. When the gas jet 26 is blown to the flowing down molten metal 25, the molten metal 25 is scattered, and the atomized molten metal 25 is incorporated in the cooling liquid layer 9. As a result, the atomized molten metal 25 is cooled and solidified, whereby a soft magnetic powder is obtained.

In the spinning water atomization method, by continuously supplying the cooling liquid, an extremely high cooling rate can be stably maintained, and therefore, the amorphous state before the heat treatment of a soft magnetic powder to be produced is stabilized. As a result, by performing the heat treatment thereafter, a soft magnetic powder having crystal grains with a uniform grain diameter can be efficiently produced.

Further, the molten metal 25 atomized to a given size by the gas jet 26 falls by inertia until it is incorporated in the cooling liquid layer 9. Therefore, the liquid droplets are spheroidized at this time. As a result, a soft magnetic powder can be produced.

For example, the flow-down amount of the molten metal 25 to be allowed to flow down from the crucible 15 varies depending also on the device size and is not particularly limited, but is preferably controlled to be 1 kg or less per minute. According to this, when the molten metal 25 is scattered, it is scattered as liquid droplets with an appropriate size, and therefore, a soft magnetic powder having an average particle diameter as described above is obtained. Further, by controlling the amount of the molten metal 25 to be supplied in a given time to a certain degree, also a cooling rate is sufficiently obtained. For example, by decreasing the flow-down amount of the molten metal 25 within the above range, it is possible to perform adjustment such that the average particle diameter is decreased.

On the other hand, the outer diameter of the thin stream of the molten metal 25 to be allowed to flow down from the crucible 15, in other words, the inner diameter of the flow-down port of the crucible 15 is not particularly limited, but is preferably 1 mm or less. According to this, it becomes easy to make the gas jet 26 uniformly hit the thin stream of the molten metal 25, and therefore, it becomes easy to uniformly scatter the liquid droplets with an appropriate size. As a result, a soft magnetic powder having an average particle diameter as described above is obtained. Then, also in this case, the amount of the molten metal 25 to be supplied in a given time is controlled, and therefore, the cooling rate is also sufficiently obtained.

Further, the flow rate of the gas jet 26 is not particularly limited, but is preferably set to 100 m/s or more and 1000 m/s or less. According to this, also in this case, the molten metal 25 can be scattered as liquid droplets with an appropriate size, and therefore, a soft magnetic powder having an average particle diameter as described above is obtained. Further, the gas jet 26 has a sufficient speed, and therefore, a sufficient speed is also given to the scattered liquid droplets, and therefore, the liquid droplets become finer, and also the time until the liquid droplets are incorporated in the cooling liquid layer 9 is shortened. As a result, the liquid droplets can be spheroidized in a short time and also cooled in a short time. For example, by increasing the flow rate of the gas jet 26 within the above range, it is possible to perform adjustment such that the average particle diameter is decreased.

Further, as other conditions, for example, it is preferred that the pressure when ejecting the cooling liquid to be supplied to the cooling cylindrical body 1 is set to about 50 MPa or more and 200 MPa or less, the liquid temperature is set to about −10° C. or higher and 40° C. or lower. According to this, the flow rate of the cooling liquid layer 9 is optimized, and the atomized molten metal 25 can be appropriately and evenly cooled.

Further, the temperature of the molten metal 25 is preferably set to about Tm+20° C. or higher and Tm+200° C. or lower, and more preferably set to about Tm+50° C. or higher and Tm+150° C. or lower wherein Tm is the melting point of the soft magnetic powder to be produced. According to this, when the molten metal 25 is atomized by the gas jet 26, the variation in the properties among particles can be suppressed particularly small, and also the amorphization before the heat treatment of the soft magnetic powder to be produced can be more reliably achieved.

The gas jet 26 can also be substituted by a liquid jet as needed.

The cooling rate when cooling the molten metal 25 in the atomization method is preferably $1\times10^{4}$° C./s or more, more preferably $1\times10^{5}$° C./s or more, and further more preferably $1\times10^{6}$° C./s or more. By the rapid cooling in this manner, particularly stable amorphization can be achieved, and a soft magnetic powder having crystal grains with a uniform grain diameter is finally obtained. Further, a variation in the compositional ratio among the particles of the soft magnetic powder can be suppressed. In addition, by increasing the cooling rate, the above-mentioned Fe concentration can be made higher than the O concentration.

The soft magnetic powder produced as described above is subjected to a crystallization treatment. By doing this, at least part of the amorphous structure is crystallized, whereby a crystal grain is formed.

The crystallization treatment can be performed by subjecting the soft magnetic powder containing an amorphous structure to the heat treatment. The temperature of the heat treatment is not particularly limited, but is preferably 520° C. or higher and 640° C. or lower, more preferably 530° C. or higher and 630° C. or lower, further more preferably 540° C. or higher and 620° C. or lower. As for the time of the heat treatment, the time to maintain the powder at the temperature is set to preferably 1 minute or more and 180 minutes or less, more preferably 3 minutes or more and 120 minutes or less, further more preferably 5 minutes or more and 60 minutes or less. By setting the temperature and time of the heat treatment within the above ranges, respectively, the crystal grains having a more uniform grain diameter can be formed.

When the temperature or time of the heat treatment is less than the above lower limit, depending on the composition of the soft magnetic powder or the like, there is a fear that the crystallization may be insufficient, and also the uniformity of the grain diameter may be poor. On the other hand, when the temperature or time of the heat treatment exceeds the above upper limit, depending on the composition of the soft magnetic powder or the like, there is a fear that crystallization may excessively proceed, and also the uniformity of the grain diameter may be poor.

The temperature increasing rate and the temperature decreasing rate in the crystallization treatment affect the grain diameter of the crystal grain formed by the heat treatment and the uniformity of the grain diameter, and also the distribution or the grain diameter of the Cu segregated portion and the Cu concentration.

The temperature increasing rate is preferably 10° C./min or more and 35° C./min or less, more preferably 10° C./min or more and 30° C./min or less, and further more preferably 15° C./min or more and 25° C./min or less. By setting the temperature increasing rate within the above range, the grain diameter of the crystal grain, the distribution or the grain diameter of the Cu segregated portion, or the Cu concentration can be made to fall within the above range. When the temperature increasing rate is less than the above lower limit, the time of exposure to a high temperature becomes longer, and therefore, there is a fear that the grain diameter of the crystal grain may become too large. When the temperature increasing rate exceeds the above upper limit, there is a fear that the grain diameter of the crystal grain may become too small, the distribution of the Cu segregated portion may become too shallow, the grain diameter of the Cu segregated portion may become too small, or the Cu concentration may become too low.

The temperature decreasing rate is preferably 40° C./min or more and 80° C./min or less, more preferably 50° C./min or more and 70° C./min or less, and further more preferably 55° C./min or more and 65° C./min or less. By setting the temperature decreasing rate within the above range, the grain diameter of the crystal grain, the distribution or the grain diameter of the Cu segregated portion, or the Cu concentration can be made to fall within the above range. When the temperature decreasing rate is less than the above lower limit, the time of exposure to a high temperature becomes longer, and therefore, there is a fear that the grain diameter of the crystal grain may become too large. When the temperature decreasing rate exceeds the above upper limit, there is a fear that the grain diameter of the crystal grain may become too small, the distribution of the Cu segregated portion may become too shallow, the grain diameter of the Cu segregated portion may become too small, or the Cu concentration may become too low.

The atmosphere of the crystallization treatment is not particularly limited, but is preferably an inert gas atmosphere such as nitrogen or argon, a reducing gas atmosphere such as hydrogen or an ammonia decomposition gas, or a reduced pressure atmosphere thereof. According to this, crystallization can be achieved while suppressing oxidation of the metal, and thus, a soft magnetic powder having excellent magnetic properties is obtained.

In this manner, the soft magnetic powder according to the embodiment can be produced.

The thus obtained soft magnetic powder may be classified as needed. Examples of the classification method include dry classification such as sieve classification, inertial classification, centrifugal classification, and wind power classification, and wet classification such as sedimentation classification.

Further, an insulating film may be formed on the surface of each particle of the obtained soft magnetic powder as needed. Examples of the constituent material of this insulating film include inorganic materials such as phosphates such as magnesium phosphate, calcium phosphate, zinc phosphate, manganese phosphate, and cadmium phosphate, and silicates such as sodium silicate. Further, it may be a material appropriately selected from organic materials listed as the constituent material of a binding material described later.

3. Powder Magnetic Core and Magnetic Element

Next, the powder magnetic core and the magnetic element according to the embodiment will be described.

The magnetic element according to the embodiment can be applied to, for example, various magnetic elements including a magnetic core such as a choke coil, an inductor, a noise filter, a reactor, a transformer, a motor, an actuator, a solenoid valve, and an electrical generator. Further, the powder magnetic core according to the embodiment can be applied to a magnetic core included in these magnetic elements.

Hereinafter, two types of coil parts will be described as representative examples of the magnetic element.

3.1. Toroidal Type

First, a coil part of toroidal type which is an example of the magnetic element according to the embodiment will be described.

Figure 3:
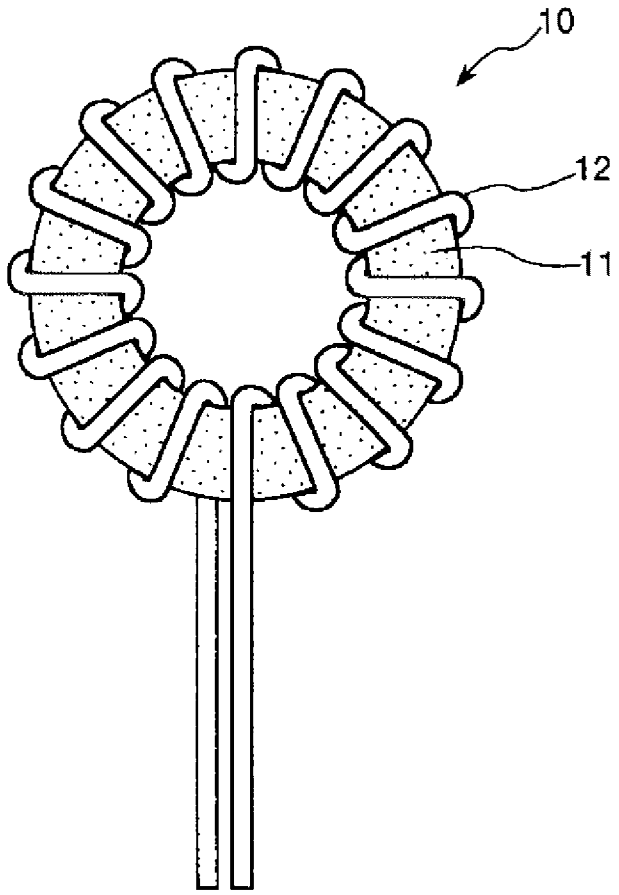
FIG. 3 is a plan view schematically showing a coil part of toroidal type.

FIG. 3 is a plan view schematically showing a coil part of toroidal type.

A coil part 10 shown in FIG. 3 includes a powder magnetic core 11 having a ring shape and a conductive wire 12 wound around the powder magnetic core 11. Such a coil part 10 is generally referred to as "toroidal coil".

The powder magnetic core 11 is obtained by mixing the soft magnetic powder according to the embodiment and a binding material, supplying the obtained mixture in a molding die, and press molding the mixture. That is, the powder magnetic core 11 is a green compact containing the soft magnetic powder according to the embodiment. Such a powder magnetic core 11 has a high saturation magnetic flux density and a low core loss. As a result, when the powder magnetic core 11 is mounted on an electronic device or the like, the power consumption of the electronic device or the like can be reduced or the performance thereof can be enhanced, and thus, it can contribute to the improvement of the reliability of the electronic device or the like.

The binding material may be added as needed, and may be omitted.

Further, the coil part 10 including such a powder magnetic core 11 has a reduced core loss and enhanced performance.

Examples of the constituent material of the binding material to be used for producing the powder magnetic core 11 include organic materials such as a silicone-based resin, an epoxy-based resin, a phenolic resin, a polyamide-based resin, a polyimide-based resin, and a polyphenylene sulfide-based resin, and inorganic materials such as phosphates such as magnesium phosphate, calcium phosphate, zinc phosphate, manganese phosphate, and cadmium phosphate, and silicates such as sodium silicate, and particularly, a thermosetting polyimide or epoxy-based resin is preferred. Such a resin material is easily cured by heating and has excellent heat resistance. Therefore, the ease of production of the powder magnetic core 11 and the heat resistance thereof can be increased.

The ratio of the binding material to the soft magnetic powder slightly varies depending on the desired magnetic flux density and mechanical properties, the allowable eddy current loss, etc. of the powder magnetic core 11 to be produced, but is preferably about 0.5 mass % or more and 5 mass % or less, more preferably about 1 mass % or more and 3 mass % or less. According to this, the powder magnetic core 11 having excellent magnetic properties such as magnetic flux density and magnetic permeability can be obtained while sufficiently binding the particles of the soft magnetic powder.

To the mixture, any of various additives may be added for an arbitrary purpose as needed.

As the constituent material of the conductive wire 12, a material having high electrical conductivity is exemplified, and examples thereof include metal materials containing Cu, Al, Ag, Au, Ni, or the like. Further, an insulating film is provided as needed at a surface of the conductive wire 12.

The shape of the powder magnetic core 11 is not limited to the ring shape shown in FIG. 3, and may be, for example, a shape in which part of a ring is missing or may be a shape in which the shape in the longitudinal direction is straight.

Further, the powder magnetic core 11 may contain a soft magnetic powder other than the soft magnetic powder according to the above-mentioned embodiment or a non-magnetic powder as needed.

3.2. Closed Magnetic Circuit Type

Next, a coil part of closed magnetic circuit type which is an example of the magnetic element according to the embodiment will be described.

Figure 4:
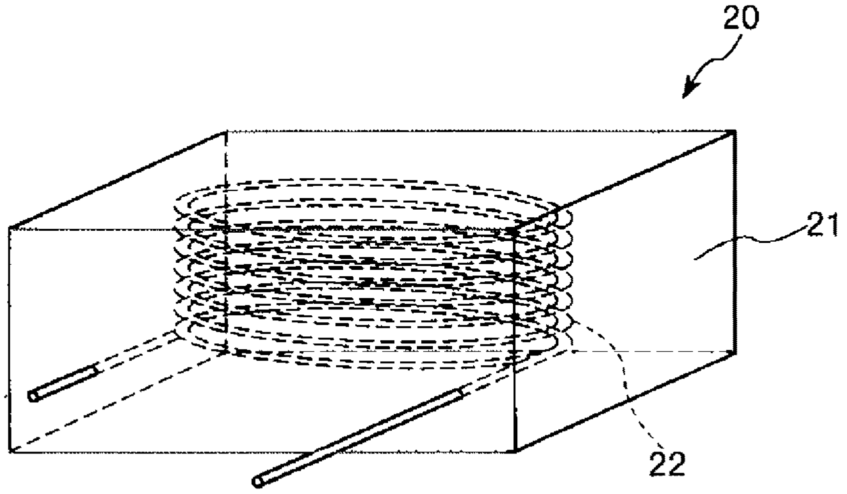
FIG. 4 is a transparent perspective view schematically showing a coil part of closed magnetic circuit type.

FIG. 4 is a transparent perspective view schematically showing the coil part of closed magnetic circuit type.

Hereinafter, the coil part of closed magnetic circuit type will be described, however, in the following description, different points from the above-mentioned coil part of toroidal type will be mainly described and the description of the same matter will be omitted.

As shown in FIG. 4, a coil part 20 according to the embodiment is configured such that a conductive wire 22 molded into a coil shape is embedded inside a powder magnetic core 21. That is, the coil part 20 is obtained by molding the conductive wire 22 with the powder magnetic core 21. This powder magnetic core 21 has the same configuration as the above-mentioned powder magnetic core 11.

As the coil part 20 having such a configuration, a relatively small coil part is easily obtained. When such a small coil part 20 is produced, by using the powder magnetic core 21 having a high magnetic flux density and a high magnetic permeability and also having a low loss, the coil part 20 having a low loss and generating low heat so as to be adaptable to a high electric current although the size is small is obtained.

Further, since the conductive wire 22 is embedded inside the powder magnetic core 21, a gap is hardly generated between the conductive wire 22 and the powder magnetic core 21. According to this, vibration of the powder magnetic core 21 due to magnetostriction is suppressed, and thus, it is also possible to suppress the generation of noise accompanying this vibration.

When the coil part 20 according to the embodiment as described above is produced, first, the conductive wire 22 is disposed in the cavity of a molding die, and also a granulated powder containing the soft magnetic powder according to the embodiment is packed in the cavity. That is, the granulated powder is packed therein so as to include the conductive wire 22 therein.

Subsequently, the granulated powder is pressed together with the conductive wire 22, whereby a molded body is obtained.

Subsequently, in the same manner as in the above-mentioned embodiment, the obtained molded body is subjected to the heat treatment. By doing this, the binding material is cured, whereby the powder magnetic core 21 and the coil part 20 are obtained.

The powder magnetic core 21 may contain a soft magnetic powder other than the soft magnetic powder according to the above-mentioned embodiment or a nonmagnetic powder as needed.

4. Electronic Device

Next, an electronic device including the magnetic element according to the embodiment will be described in detail with reference to FIGS. 5 to 7.

Figure 5:
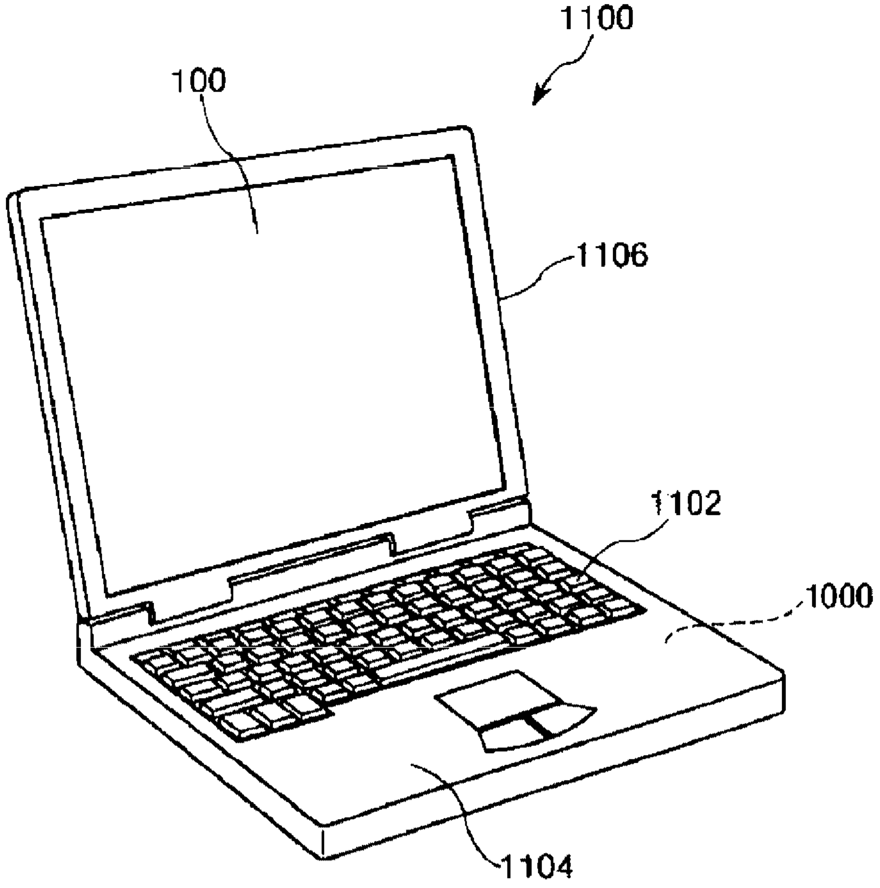
FIG. 5 is a perspective view showing a configuration of a mobile-type personal computer which is an electronic device including a magnetic element according to an embodiment.

FIG. 5 is a perspective view showing a mobile-type personal computer which is an electronic device including the magnetic element according to the embodiment. A personal computer 1100 shown in FIG. 5 includes a main body 1104 provided with a key board 1102, and a display unit 1106 provided with a display portion 100. The display unit 1106 is supported rotatably with respect to the main body 1104 via a hinge structure. Such a personal computer 1100 includes, for example, a built-in magnetic element 1000 such as a choke coil, an inductor, or a motor for a switched-mode power supply.

Figure 6:
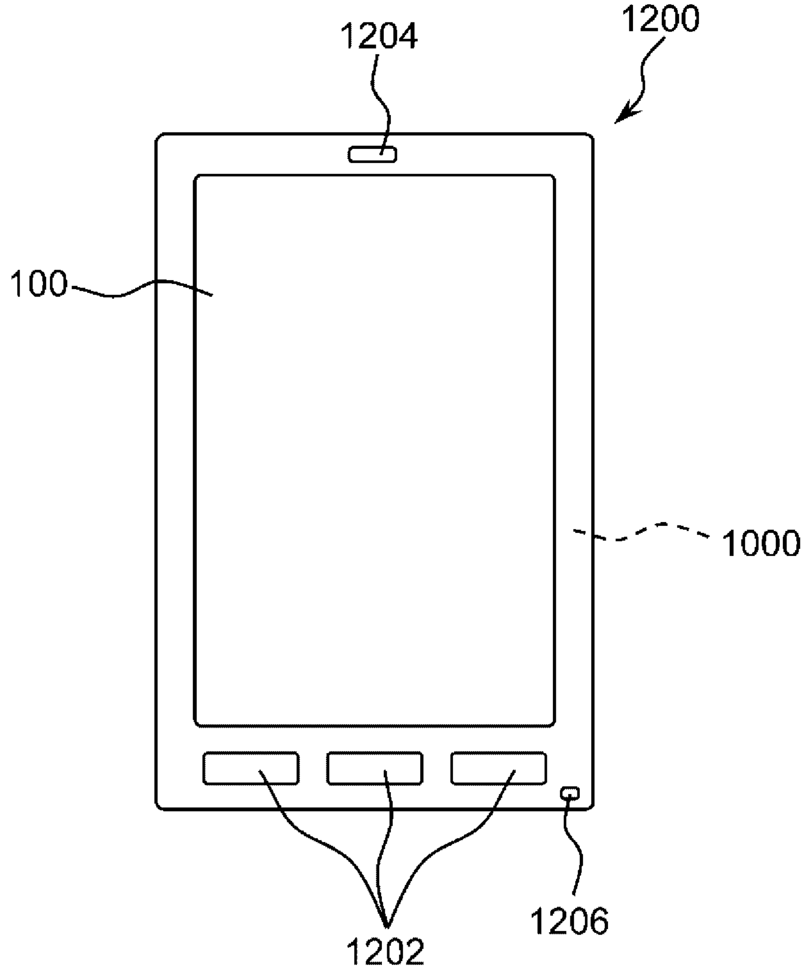
FIG. 6 is a plan view showing a configuration of a smartphone which is an electronic device including the magnetic element according to the embodiment.

FIG. 6 is a plan view showing a smartphone which is an electronic device including the magnetic element according to the embodiment. A smartphone 1200 shown in FIG. 6 includes multiple operation buttons 1202, an earpiece 1204, and a mouthpiece 1206. Further, between the operation buttons 1202 and the earpiece 1204, the display portion 100 is placed. Such a smartphone 1200 includes, for example, the built-in magnetic element 1000 such as an inductor, a noise filter, or a motor.

Figure 7:
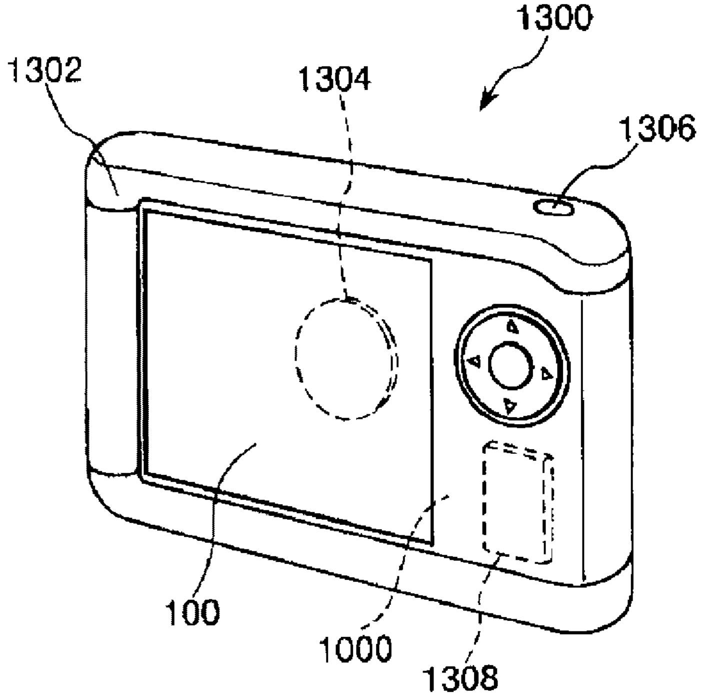
FIG. 7 is a perspective view showing a configuration of a digital still camera which is an electronic device including the magnetic element according to the embodiment.

FIG. 7 is a perspective view showing a digital still camera which is an electronic device including the magnetic element according to the embodiment. In FIG. 7, coupling to an external device is also briefly shown. A digital still camera 1300 photoelectrically converts an optical image of a subject and generates an image capture signal by an image capture element such as a CCD (Charge Coupled Device).

The digital still camera 1300 shown in FIG. 7 includes the display portion 100 provided at a back face of a case 1302. The display portion 100 functions as a finder that displays a subject as an electronic image. Further, at a front side of the case 1302, that is, at a rear side in the drawing, a light receiving unit 1304 including an optical lens, a CCD, or the like is provided.

When a person who takes a picture confirms an image of a subject displayed in the display portion 100 and presses a shutter button 1306, an image capture signal of the CCD at this time is transferred and stored in a memory 1308. Also such a digital still camera 1300 includes, for example, the built-in magnetic element 1000 such as an inductor or a noise filter.

Examples of the electronic device according to the embodiment includes a cellular phone, a tablet terminal, a timepiece, an inkjet-type ejection device such as an inkjet printer, a laptop-type personal computer, a television, a video camera, a videotape recorder, a car navigation device, a pager, an electronic organizer, an electronic dictionary, an electronic calculator, an electronic gaming machine, a word processor, a workstation, a videophone, a security television monitor, electronic binoculars, a POS terminal, medical devices such as an electronic thermometer, a blood pressure meter, a blood sugar meter, an electrocardiogram monitoring device, an ultrasound diagnostic device, and an electronic endoscope, a fish finder, various measurement devices, meters and gauges for vehicles, airplanes, and ships, control devices for moving objects such as a control device for automobiles, a control device for airplanes, a control device for railroad cars, and a control device for ships, and a flight simulator, other than the personal computer in FIG. 5, the smartphone in FIG. 6, and the digital still camera in FIG. 7.

As described above, such an electronic device includes the magnetic element according to the embodiment. Therefore, the electronic device receives the effects of the magnetic element such that the coercive force is low and the saturation magnetic flux density is high, and a decrease in the size and an increase in the output of the electronic device can be achieved.

Hereinabove, the soft magnetic powder, the powder magnetic core, the magnetic element, and the electronic device according to the present disclosure have been described based on the preferred embodiments, but the present disclosure is not limited thereto.

For example, in the above-mentioned embodiments, as the application example of the soft magnetic powder according to the present disclosure, the green compact such as the powder magnetic core is described, however, the application example is not limited thereto, and for example, it may be a magnetic fluid or a magnetic device such as a magnetic head.

Further, the shapes of the powder magnetic core and the magnetic element are also not limited to those shown in the drawings, and may be any shapes.

EXAMPLES

Next, specific examples of the present disclosure will be described.

5. Production of Powder Magnetic Core 5.1. Sample No. 1

First, the raw material was melted in a high-frequency induction furnace, and also powdered by a spinning water atomization method, whereby a soft magnetic powder was obtained. At this time, the flow-down amount of the molten metal to be allowed to flow down from the crucible was set to 0.5 kg/min, the inner diameter of the flow-down port of the crucible was set to 1 mm, and the flow rate of the gas jet was set to 900 m/s. Subsequently, classification was performed by a wind power classifier. The composition of the obtained soft magnetic powder is shown in Table 1. In the determination of the composition, an optical emission spectrometer for solids, model: Spectrolab, type: LAVMB08A manufactured by SPECTRO Analytical Instruments GmbH was used. As a result, the total content of impurities was 0.50 at % or less.

Subsequently, with respect to the obtained soft magnetic powder, a particle size distribution was measured. This measurement was performed using a laser diffraction particle size distribution analyzer, Microtrack HRA9320-X100, manufactured by Nikkiso Co., Ltd. Then, the average particle diameter D50 of the soft magnetic powder was determined from the particle size distribution and found to be 20 μm. Further, with respect to the obtained soft magnetic powder, it was evaluated whether or not the structure before the heat treatment is amorphous by an X-ray diffractometer.

Subsequently, the obtained soft magnetic powder was heated in a nitrogen atmosphere. The heating conditions are as shown in Table 1.

Subsequently, the obtained soft magnetic powder was mixed with an epoxy resin which is a binding material, whereby a mixture was obtained. The addition amount of the epoxy resin was set to 2 parts by mass with respect to 100 parts by mass of the soft magnetic powder.

Subsequently, the obtained mixture was stirred, and then dried in a short time, whereby a block-shaped dry material was obtained. Then, the thus obtained dry material was sieved through a sieve with an opening of 400 μm, and then pulverized, whereby a granulated powder was obtained. The obtained granulated powder was dried at 50° C. for 1 hour.

Subsequently, the obtained granulated powder was packed in a molding die, and a molded body was obtained under the following molding conditions.

Molding Conditions

Molding method: press molding

Shape of molded body: ring shape

Dimensions of molded body: outer diameter: 14 mm, inner diameter: 8 mm, thickness: 3 mm Molding pressure: 3 t/cm$^2$ (294 MPa)

Subsequently, the molded body was heated in an air atmosphere at a temperature of 150° C. for 0.5 hours to cure the binding material. By doing this, a powder magnetic core was obtained.

5.2. Sample Nos. 2 to 21

Powder magnetic cores were obtained in the same manner as the sample No. 1 except that the production conditions of the soft magnetic powder and the production conditions of the powder magnetic core were changed as shown in Table 1. Note that the average particle diameter D50 of each sample fell within a range of 10 μm or more and 30 μm or less.

TABLE 1

| Sample No. | Example/Comparative Example | Type of atomization method | Composition of soft magnetic powder, etc.: Fe x (at %) | Cu a (at %) | Nb b (at %) | Si (at %) | B (at %) | Total (at %) | Si + B (at %) |
|---|---|---|---|---|---|---|---|---|---|
| No. 1 | Comparative Example | spinning water | 73.5 | 1.0 | 3.0 | 18.0 | 4.5 | 100 | 22.5 |
| No. 2 | Example | spinning water | 73.5 | 1.0 | 3.0 | 15.8 | 6.8 | 100 | 22.5 |
| No. 3 | Example | spinning water | 73.5 | 1.0 | 3.0 | 13.5 | 9.0 | 100 | 22.5 |
| No. 4 | Example | spinning water | 73.5 | 1.0 | 3.0 | 11.3 | 11.3 | 100 | 22.5 |
| No. 5 | Example | spinning water | 73.5 | 1.0 | 3.0 | 9.0 | 13.5 | 100 | 22.5 |
| No. 6 | Example | spinning water | 73.5 | 1.0 | 3.0 | 6.8 | 15.8 | 100 | 22.5 |
| No. 7 | Example | spinning water | 75.0 | 1.0 | 3.0 | 6.3 | 14.7 | 100 | 21.0 |
| No. 8 | Comparative Example | spinning water | 77.0 | 1.0 | 3.0 | 9.5 | 9.5 | 100 | 19.0 |
| No. 9 | Example | spinning water | 77.0 | 1.0 | 3.0 | 7.6 | 11.4 | 100 | 19.0 |
| No. 10 | Example | spinning water | 77.0 | 1.0 | 3.0 | 5.7 | 13.3 | 100 | 19.0 |
| No. 11 | Example | spinning water | 78.0 | 1.0 | 3.0 | 5.4 | 12.6 | 100 | 18.0 |
| No. 12 | Example | spinning water | 78.0 | 1.0 | 3.0 | 1.8 | 16.2 | 100 | 18.0 |
| No. 13 | Comparative Example | spinning water | 79.0 | 1.0 | 3.0 | 5.1 | 11.9 | 100 | 17.0 |
| No. 14 | Example | spinning water | 79.0 | 1.0 | 3.0 | 1.7 | 15.3 | 100 | 17.0 |
| No. 15 | Comparative Example | spinning water | 80.0 | 1.0 | 3.0 | 1.6 | 14.4 | 100 | 16.0 |
| No. 16 | Comparative Example | spinning water | 77.0 | 1.0 | 3.0 | 5.7 | 13.3 | 100 | 19.0 |
| No. 17 | Comparative Example | spinning water | 77.0 | 1.0 | 3.0 | 5.7 | 13.3 | 100 | 19.0 |
| No. 18 | Comparative Example | spinning water | 77.0 | 1.0 | 3.0 | 5.7 | 13.3 | 100 | 19.0 |
| No. 19 | Comparative Example | spinning water | 77.0 | 1.0 | 3.0 | 5.7 | 13.3 | 100 | 19.0 |
| No. 20 | Comparative Example | water | 77.0 | 1.0 | 3.0 | 5.7 | 13.3 | 100 | 19.0 |
| No. 21 | Comparative Example | water | 77.0 | 1.0 | 3.0 | 5.7 | 13.3 | 100 | 19.0 |

| Sample No. | Composition of soft magnetic powder, etc.: B/(Si + B) y (—) | Region (—) | Structure of particle before heat treatment | Heat treatment for soft magnetic powder: Heating temperature (° C.) | Heating time (min) | Temperature increasing rate (° C./min) | Temperature decreasing rate (° C./min) |
|---|---|---|---|---|---|---|---|
| No. 1 | 0.20 | — | crystalline | 560 | 15 | 15 | 55 |
| No. 2 | 0.30 | A | amorphous | 560 | 15 | 15 | 55 |
| No. 3 | 0.40 | A | amorphous | 560 | 15 | 15 | 55 |
| No. 4 | 0.50 | A | amorphous | 560 | 15 | 15 | 55 |
| No. 5 | 0.60 | A | amorphous | 560 | 15 | 15 | 55 |
| No. 6 | 0.70 | A | amorphous | 560 | 15 | 15 | 55 |
| No. 7 | 0.70 | B | amorphous | 560 | 15 | 15 | 55 |
| No. 8 | 0.50 | — | crystalline | 540 | 20 | 25 | 65 |
| No. 9 | 0.60 | B | amorphous | 540 | 20 | 25 | 65 |
| No. 10 | 0.70 | C | amorphous | 540 | 20 | 25 | 65 |
| No. 11 | 0.70 | A | amorphous | 540 | 20 | 25 | 65 |
| No. 12 | 0.90 | C | amorphous | 540 | 20 | 30 | 75 |
| No. 13 | 0.70 | — | crystalline | 540 | 20 | 25 | 65 |
| No. 14 | 0.90 | A | amorphous | 540 | 20 | 25 | 65 |
| No. 15 | 0.90 | — | crystalline | 540 | 20 | 25 | 65 |
| No. 16 | 0.70 | C | amorphous | 560 | 15 | 5 | 60 |
| No. 17 | 0.70 | C | amorphous | 560 | 15 | 20 | 30 |
| No. 18 | 0.70 | C | amorphous | 560 | 15 | 45 | 60 |

TABLE 1-continued

| | | | | | | | |
|---|---|---|---|---|---|---|---|
| No. 19 | 0.70 | C | amorphous | 560 | 15 | 20 | 90 |
| No. 20 | 0.70 | C | amorphous | 560 | 15 | 20 | 30 |
| No. 21 | 0.70 | C | amorphous | 560 | 15 | 20 | 30 |

In Table 1, among the soft magnetic powders of the respective sample Nos., those corresponding to the present disclosure are denoted by "Example", and those not corresponding to the present disclosure are denoted by "Comparative Example".

Further, when x and y in the alloy composition of the soft magnetic powder of each sample No. are located inside the region C, "C" was entered in the column of "Region", when x and y are located outside the region C and inside the region B, "B" was entered in the column of "Region", and when x and y are located outside the region B and inside the region A, "A" was entered in the column of "Region". Further, when x and y are located outside the region A, "-" was entered in the column of "Region".

6. Evaluation of Soft Magnetic Powder and Powder Magnetic Core 6.1. Evaluation of Particle Structure of Soft Magnetic Powder The soft magnetic powders obtained in the respective Examples and the respective Comparative Examples were each processed into a thin piece using a focused ion beam device, whereby test pieces were obtained.

Subsequently, the obtained test pieces were observed using a scanning transmission electron microscope, and also an elemental analysis was performed, whereby surface analysis images were obtained.

Subsequently, the grain diameter of each crystal grain was measured from the observation image, and the area ratio of crystal grains having a grain diameter falling within a specific range of 1.0 nm or more and 30.0 nm or less was determined, which was regarded as the volume ratio of crystal grains having a predetermined grain diameter. The measurement results are shown in Table 2.

Further, with respect to the Cu segregated portion, the Si segregated portion, the Fe concentration distribution, and the O concentration distribution, various indices shown in Table 2 were obtained by analyzing the surface analysis images.

Specifically, among the Cu segregated portions, one having the highest Cu concentration was specified, and the depth of the Cu segregated portion from the surface of the particle, and the maximum Cu concentration were measured. Further, the grain diameter of the Cu segregated portion was measured, and the average grain diameter was calculated.

Further, the Fe concentration and the O concentration at a position 12 nm from the surface of the particle were compared, and when the Fe concentration was higher, "Fe>O" was entered in Table 2, and when the O concentration was higher, "O>Fe" was entered in Table 2. In addition, the presence or absence of the Si segregated portion was evaluated.

6.2. Resistance Value of Green Compact of Soft Magnetic Powder

With respect to a green compact of each of the soft magnetic powders obtained in the respective Examples and the respective Comparative Examples, an electrical resistance value was measured by the following method.

First, a lower punch electrode was placed at a lower end in a cavity of a molding die having a columnar cavity with an inner diameter of 8 mm. Subsequently, 0.7 g of the soft magnetic powder was packed in the cavity. Subsequently, an upper punch electrode was placed at an upper end in the cavity. Then, the molding die, the lower punch electrode, and the upper punch electrode were placed in a load application device. Subsequently, a load of 20 kgf was applied in a direction in which a distance between the lower punch electrode and the upper punch electrode comes closer using a digital force gauge. Then, an electrical resistance value between the lower punch electrode and the upper punch electrode was measured in a state where the load was applied.

Then, the measured resistance value was evaluated according to the following evaluation criteria.

A: The resistance value is 5.0 kΩ or more.

B: The resistance value is 3.0 kΩ or more and less than 5.0 kΩ.

C: The resistance value is 0.3 kΩ or more and less than 3.0 kΩ.

D: The resistance value is less than 0.3 kΩ.

The evaluation results are shown in Table 2.

6.3. Measurement of Coercive Force of Soft Magnetic Powder

With respect to each of the soft magnetic powders obtained in the respective Examples and the respective Comparative Examples, the coercive force was measured using the following measurement device.

Measurement device: a vibrating sample magnetometer, VSM system, TM-VSM 1230-MHHL, manufactured by Tamakawa Co., Ltd.

Then, the measured coercive force was evaluated according to the following evaluation criteria.

A: The coercive force is less than 0.90 Oe.

B: The coercive force is 0.90 Oe or more and less than 1.33 Oe.

C: The coercive force is 1.33 Oe or more and less than 1.67 Oe.

D: The coercive force is 1.67 Oe or more and less than 2.00 Oe.

E: The coercive force is 2.00 Oe or more and less than 2.33 Oe.

F: The coercive force is 2.33 Oe or more.

The evaluation results are shown in Table 2.

6.4. Calculation of Saturation Magnetic Flux Density of Soft Magnetic Powder

With respect to each of the soft magnetic powders obtained in the respective Examples and the respective Comparative Examples, the saturation magnetic flux density was calculated as follows.

First, the true specific gravity ρ of each of the soft magnetic powders was measured using a fully automatic gas displacement pycnometer, AccuPyc 1330, manufactured by Micromeritics Instrument Corporation.

Subsequently, the maximum magnetization Mm of the soft magnetic powder was measured using the above-mentioned vibrating sample magnetometer.

Subsequently, the saturation magnetic flux density Bs was determined according to the following formula.

$$Bs = 4\pi/10000 \times \rho \times Mm$$

The calculation results are shown in Table 2.

6.5. Measurement of Magnetic Permeability of Powder Magnetic Core

With respect to each of the powder magnetic cores obtained in the respective Examples and the respective Comparative Examples, the magnetic permeability was measured under the following measurement conditions.

Measurement device: an impedance analyzer, 4194A, manufactured by Agilent Technologies, Inc.

Measurement frequency: 100 MHz

Number of winding turns: 7

Diameter of winding wire: 0.6 mm

The measurement results are shown in Table 2.

6.6. Measurement of Core Loss of Powder Magnetic Core

With respect to each of the powder magnetic cores obtained in the respective Examples and the respective Comparative Examples, the core loss was measured under the following measurement conditions.

Measurement device: a BH analyzer, SY-8258, manufactured by Iwatsu Electric Co., Ltd.

Measurement frequency: 900 kHz

Number of winding turns: 36 on primary side, 36 on secondary side

Diameter of winding wire: 0.5 mm

Maximum magnetic flux density: 50 mT

The measurement results are shown in Table 2.

TABLE 2

| Sample | Example/ Comparative | Evaluation results: Content ratio of crystal grains having predetermined grain diameter | Cu segregated portion included in particle: Depth from surface of particle | Cu segregated portion included in particle: Maximum Cu concentration | Cu segregated portion included in particle: Average grain diameter | State of Fe concentration distribution to O concentration distribution in particle | Si segregated portion included in particle |
|---|---|---|---|---|---|---|---|
| No. | Example | vol % | nm | at % | nm | — | — |
| No. 1 | Comparative Example | 0 | 10 | 3 | 2 | Fe > O | absent |
| No. 2 | Example | 69 | 31 | 10 | 6 | Fe > O | present |
| No. 3 | Example | 71 | 62 | 16 | 7 | Fe > O | present |
| No. 4 | Example | 73 | 80 | 25 | 15 | Fe > O | present |
| No. 5 | Example | 81 | 55 | 13 | 8 | Fe > O | present |
| No. 6 | Example | 83 | 51 | 12 | 5 | Fe > O | present |
| No. 7 | Example | 85 | 43 | 11 | 4 | Fe > O | present |
| No. 8 | Comparative Example | 0 | 15 | 3 | 1 | Fe > O | absent |
| No. 9 | Example | 87 | 35 | 11 | 7 | Fe > O | present |
| No. 10 | Example | 67 | 63 | 35 | 12 | Fe > O | present |
| No. 11 | Example | 59 | 90 | 12 | 6 | Fe > O | present |
| No. 12 | Example | 51 | 38 | 7 | 4 | Fe > O | present |
| No. 13 | Comparative Example | 0 | 12 | 2 | 1 | Fe > O | absent |
| No. 14 | Example | 88 | 61 | 17 | 8 | Fe > O | present |
| No. 15 | Comparative Example | 0 | 20 | 5 | 2 | Fe > O | absent |
| No. 16 | Comparative Example | 21 | 35 | 5 | 1 | Fe > O | present |
| No. 17 | Comparative Example | 25 | 28 | 10 | 2 | Fe > O | present |
| No. 18 | Comparative Example | 15 | 13 | 4 | 2 | Fe > O | present |
| No. 19 | Comparative Example | 10 | 25 | 5 | 3 | Fe > O | present |
| No. 20 | Comparative Example | 12 | 27 | 5 | 4 | O > Fe | present |
| No. 21 | Comparative Example | 14 | 24 | 4 | 5 | O > Fe | present |

| Sample | Evaluation results: Resistance value of green compact | Coercive force | Saturation magnetic flux density | Magnetic permeability | Core loss |
|---|---|---|---|---|---|
| No. | — | — | T | — | $kW/m^3$ |
| No. 1 | D | F | 1.05 | 16.1 | 27400 |
| No. 2 | A | B | 1.14 | 23.3 | 3014 |
| No. 3 | A | A | 1.18 | 23.6 | 4200 |
| No. 4 | A | A | 1.22 | 21.1 | 4987 |
| No. 5 | A | B | 1.26 | 20.1 | 5507 |
| No. 6 | A | B | 1.29 | 19.6 | 6179 |
| No. 7 | A | B | 1.33 | 20.1 | 5768 |
| No. 8 | D | F | 1.32 | 17.3 | 49600 |
| No. 9 | A | A | 1.37 | 22.8 | 4096 |

TABLE 2-continued

| | | | | | |
|---|---|---|---|---|---|
| No. 10 | A | A | 1.41 | 20.3 | 7100 |
| No. 11 | A | c | 1.38 | 15.0 | 10464 |
| No. 12 | A | A | 1.42 | 18.0 | 6816 |
| No. 13 | D | F | 1.39 | 18.1 | 40000 |
| No. 14 | A | A | 1.43 | 22.2 | 3376 |
| No. 15 | D | F | 1.40 | 17.1 | 51200 |
| No. 16 | B | E | 1.41 | 17.1 | 43200 |
| No. 17 | B | E | 1.40 | 17.0 | 41600 |
| No. 18 | B | F | 1.40 | 17.0 | 49600 |
| No. 19 | B | E | 1.41 | 16.8 | 44800 |
| No. 20 | C | F | 1.40 | 17.0 | 49600 |
| No. 21 | C | F | 1.39 | 16.9 | 51200 |

As apparent from Table 2, in each of the soft magnetic powders obtained in the respective Examples, both a low coercive force and a high saturation magnetic flux density are achieved. Further, in the case of the powder magnetic cores containing any of the soft magnetic powders obtained in the respective Examples, the results that the magnetic permeability is high and the core loss is low were obtained. On the other hand, in the case of the soft magnetic powders obtained in the respective Comparative Examples, the results that the coercive force is high or the saturation magnetic flux density is low were obtained.

What is claimed is:

1. A soft magnetic powder, comprising particles having a composition represented by $Fe_xCu_aNb_b(Si_{1-y}B_y)_{100-x-a-b}$ provided that a, b, and x are each a number whose unit is at % and satisfy 0.3≤a≤2.0, 2.0≤b≤4.0, and 75.0≤x≤78.5, respectively, and y is a number satisfying f'(x)≤y≤0.97, in which $f'(x)=(4\times10^{-29})x^{14.93}$, wherein the particle contains a crystal grain having a grain diameter of 1.0 nm or more and 30.0 nm or less, and includes a Cu segregated portion in which Cu is segregated, the Cu segregated portion is present at a position 40 nm or more and 500 nm or less from a surface of the particle, a maximum Cu concentration in the Cu segregated portion exceeds 6.0 at %, and an Fe concentration, by at %, at a position 12 nm from the surface of the particle is higher than an O concentration, by at %, and a difference between the Fe concentration and the O concentration is 30 at % or more.

2. The soft magnetic powder according to claim 1, wherein the maximum Cu concentration in the Cu segregated portion is 10.0 at % or more.

3. The soft magnetic powder according to claim 1, wherein the particle includes a Si segregated portion in which Si is segregated, and the Si segregated portion is present between the Cu segregated portion and the surface of the particle.

4. The soft magnetic powder according to claim 1, wherein when the soft magnetic powder is formed into a columnar green compact having an inner diameter of 8 mm and a mass of 0.7 g and the green compact is compressed in an axial direction with a load of 20 kgf, a resistance value in the axial direction of the green compact is 0.3 kΩ or more.

5. The soft magnetic powder according to claim 1, wherein a content ratio of the crystal grain in the particle is 30 vol % or more.

6. A powder magnetic core, comprising the soft magnetic powder according to claim 1.

7. A magnetic element, comprising the powder magnetic core according to claim 6.

8. An electronic device, comprising the magnetic element according to claim 7.

9. The soft magnetic powder according to claim 1, wherein 75.5≤x≤78.0, and y is a number satisfying f'(x)≤y≤0.95, in which $f'(x)=(4\times10^{-29})x^{14.93}+0.05$.

10. The powder magnetic core according to claim 6, wherein a magnetic permeability at a measurement frequency of 100 MHz of the powder magnetic core is in a range of 15.0 to 23.6.

11. The powder magnetic core according to claim 6, wherein a core loss at a measurement frequency of 900 kHz of the powder magnetic core is in a range of 3014 to 10464 $kW/m^3$.

12. The soft magnetic powder according to claim 1, wherein a maximum Cu concentration in the Cu segregated portion is in a range of 16.0 at % or more and 70.0 at % or less.

13. The soft magnetic powder according to claim 1, wherein the crystal grain of the particle has a grain diameter of 5.0 nm or more and 20.0 nm or less.

14. The soft magnetic powder according to claim 1, wherein the Cu segregated portion contains a crystal grain having an average grain diameter of 3 nm or more and 20 nm or less.

15. The soft magnetic powder according to claim 1, wherein the particle includes a Si segregated portion in which Si is segregated, the Si segregated portion is present between the Cu segregated portion and the surface of the particle, a maximum Cu concentration in the Cu segregated portion is in a range of 16.0 at % or more and 70.0 at % or less, the crystal grain of the particle has a grain diameter of 5.0 nm or more and 20.0 nm or less, and the Cu segregated portion contains a crystal grain having an average grain diameter of 3 nm or more and 20 nm or less.

16. The soft magnetic powder according to claim 1, wherein the crystal grain of the particle is formed by performing crystallization by heating at a temperature of 520° C. or higher and 640° C. or lower for a duration of 1 minute or more and 180 minutes or less, the crystallization including a temperature increasing rate of 10° C./min or more and 35° C./min or less, and a temperature decreasing rate of 40° C./min or more and 80° C./min or less.

17. The soft magnetic powder according to claim 14, wherein the crystal grain of the Cu segregated portion is formed by performing crystallization by heating at a temperature of 520° C. or higher and 640° C. or lower for a duration of 1 minute or more and 180 minutes or less, the crystallization including a temperature increasing rate of 10°

C./min or more and 35° C./min or less, and a temperature decreasing rate of 40° C./min or more and 80° C./min or less.

18. The soft magnetic powder according to claim 15, wherein the crystal grain of the particle and the crystal grain of the Cu segregated portion are formed by performing crystallization by heating at a temperature of 520° C. or higher and 640° C. or lower for a duration of 1 minute or more and 180 minutes or less, the crystallization including a temperature increasing rate of 10° C./min or more and 35° C./min or less, and a temperature decreasing rate of 40° C./min or more and 80° C./min or less.

* * * * *